United States Patent [19]

Noda et al.

[11] 4,115,591

[45] Sep. 19, 1978

[54] PROCESS FOR PRODUCING KOJI AND UTILIZATION OF THE KOJI

[75] Inventors: Fumio Noda, Kamagaya; Keitaro Mogi; Toshio Sakasai, both of Noda, all of Japan

[73] Assignee: Kikkoman Shoyu Co. Ltd., Noda, Japan

[21] Appl. No.: 790,870

[22] Filed: Apr. 26, 1977

[30] Foreign Application Priority Data

Apr. 27, 1976 [JP] Japan .................................. 51-47298

[51] Int. Cl.$^2$ .......................... A23L 1/20; A23L 1/238
[52] U.S. Cl. ........................................... 426/7; 426/18; 426/46; 426/52; 426/60; 426/335; 426/532; 426/589
[58] Field of Search .................... 426/46, 11, 49, 60, 426/335, 52, 532, 589, 7, 18

[56] References Cited

U.S. PATENT DOCUMENTS 4,028,470   6/1977   Hayashi et al. ...................... 426/589

OTHER PUBLICATIONS

Furia, "Handbook of Food Additives", Chemical Rubber Co., 1968, pp. 158–163 and 169–172.

*Primary Examiner*—R. B. Penland
*Attorney, Agent, or Firm*—Sherman & Shalloway

[57] ABSTRACT

In a process for producing koji which comprises inoculating a koji mold in a modified koji substrate and cultivating it at a temperature of 20° to 40° C. for a time sufficient to produce koji, the improvement wherein the cultivation is carried out in the presence of 0.05 to 8% by weight, based on the total weight of the unmodified koji substrate, of a sodium or potassium salt of an aliphatic carboxylic acid containing up to 4 carbon atoms. The improved process makes it possible to inhibit bacterial contamination of the cultivation system, and provides good quality koji which exhibits high ratios of nitrogen and sugar utilization in the manufacture of fermented food products such as soy sauce, miso and mirin.

8 Claims, No Drawings

PROCESS FOR PRODUCING KOJI AND UTILIZATION OF THE KOJI

This invention relates to a process for producing koji which is suitable for use in the manufacture of fermented food products such as soy sauce, miso, mirin, and sake (Japanese wine from rice), and particularly, to an improved process for producing koji for fermented food products, which makes it possible to inhibit the growth of contaminating bacteria that adversely affect the quality of koji, and to increase the ratios of nitrogen and sugar utilization when the koji is used for the manufacture of fermented food products.

More specifically, the invention relates to a process for producing koji for fermented food products which comprises modifying an unmodified koji substrate, preferably composed of a material selected from the group consisting of naturally occurring vegetable or fish protein materials and naturally occurring vegetable carbohydrate materials, inoculating a koji mold in the modified koji substrate, and cultivating it preferably at a temperature of 20° to 40° C., wherein the koji mold is cultivated in the presence of 0.05 to 8%, preferably 0.1 to 3%, by weight, based on the total weight of the unmodified koji substrate, of a sodium or potassium salt of an aliphatic carboxylic acid having up to 4 carbon atoms, the salt being present preferably at any time during a period from the modification of the koji substrate to the end of the cultivation, especially preferably during the first half of the cultivation step.

According to the conventional practice, koji for fermented food products is produced by inoculating a koji mold or a koji mold in the form of a seed starter in a koji substrate, and cultivating it in a microbiologically open system. Hence, there is a fairly high degree of possibility that contaminating bacteria which adversely affect the quality of the koji product will grow, and contaminate the cultivation system. When the contamination of the cultivation system by bacteria increases beyond an allowable extent, the koji is reduced both in quality and yield. In the technical field of producing koji for fermented food products, prevention of this undesirable bacterial contamination has remained a problem to be solved. Food sanitation also requires that the contamination of the cultivation system should be removed even if it is to such an extent as will not directly deteriorate the quality of the koji or reduce its yield. Moreover, the ratio of nitrogen utilization of koji produced by the conventional techniques is about 82 to 83% at the highest when it is used for the manufacture of fermented food products. No substantial increase in nitrogen utilization can be achieved even if efforts are made to increase the amounts of the enzymes by using well screened koji molds which will form powerful protease or amylase, or by growing the koji molds sufficiently under a strict control of koji-making by highly skilled experts. It has been desired therefore to increase the ratio of nitrogen utilization.

A number of suggestions have been made heretofore in an attempt to prevent bacterial contamination during the production of koji. They include, for example, a classic method for koji making by spraying a mixture of a solid powder of an organic acid such as tartaric acid or citric acid and spores of a koji mold on a koji substrate, and then cultivating the koji mold (Japanese Pat. Nos. 66937 patented in 1924 and 81440 patented in 1928); a method in which to use a modified koji substrate obtained by adding ammonium acetate to an unmodified koji substrate and then modifying it with steam (Japanese Patent Publication No. 7583/56); and a method in which to use a modified koji substrate obtained by heating an unmodified koji substrate in the presence of a lower alcohol, removing the alcohol, and adding an inorganic acid or an organic acid other than acetic acid (Japanese Patent Publication No. 15509/66). Japanese Laid-Open Patent Publication Nos. 33097/73, 53546/75 and 53547/75, on the other hand, suggested a method in which to use a modified koji substrate obtained by adding a calcium salt or magnesium salt of an inorganic or organic acid and then steaming it, in an attempt to increase the ratio of utilization of the proteinous material of the koji substrate. In these prior suggestions, attempts to provide a sufficient effect against bacterial contamination will result in adverse effects on the normal growth of the koji mold, whereas attempts to avoid the adverse effects will not bring about a satisfactory effect of inhibiting bacterial contamination or will deteriorate the quality of the resulting koji. Moreover, no appreciable increase in the ratio of nitrogen utilization of the resulting koji can be achieved.

It has also been suggested to inhibit the growth of undesired contaminating bacteria by including sulfite salts or sulfurous acid in the koji substrate. This technique has the defect that the amount of sulfurous acid or its salts rapidly decreases during the cultivation of the koji mold because, for example, oxidation of sulfurous acid in the koji substrate, and the reaction of sulfurous acid with the components of the koji substrate take place. This could be avoided by using a large quantity of sulfurous acid or its salts, but the presence of such a large quantity of sulfurous acid or its salts markedly retards the germination of the conidia of the koji mold or the growth of its hyphae, and reduces the quality of the resulting koji. The ratio of nitrogen utilization of the koji can neither be increased in this suggestion. The results are therefore unsatisfactory for practical application.

It was also suggested to inhibit the growth of contaminating bacteria and to facilitate the growth of the koji mold by cultivating the koji mold in a modified koji substrate in the presence of acetic acid (U.S. Ser. No. 693,762) now U.S. Pat. No. 4,028,470. This patent process successfully achieves the inhibition of bacterial contamination, but still leaves room for improvement in the enzyme activity of the resulting koji. A substantial increase in nitrogen utilization is not achieved with the patented process.

Another prior method involves the use of an antibacterial agent such as antibiotics in the koji substrate. The method is not acceptable, however, from the standpoint of food sanitation because resistant bacteria will develop, or the human intake of the antibacterial agent may cause side-effects. An increase in nitrogen utilization of the resulting koji can neither be expected with this method.

The present inventors continued investigations in order to overcome the disadvantages of the prior suggestions described above, and to provide a process for producing koji which can exhibit a satisfactory effect of inhibiting bacterial contamination, can achieve an increase in the ratios of utilization of nitrogen and sugar components, and can afford fermented food products having superior taste, flavor and quality. These investigations led to the discovery that superior enzyme activity and increased ratios of nitrogen and sugar utilization as well as the inhibition of bacterial contamination can be achieved by performing the cultivation in the presence of a specified small amount of a sodium or potassium salt of an aliphatic carboxylic acid containing up to 4 carbon atoms which is cheap and readily available; and that fermented food products manufactured by using the resulting koji have superior taste, flavor and quality.

It is an object of this invention therefore to provide a process for making koji which gives a satisfactory effect of inhibiting the growth of contaminating bacteria, the koji having superior enzyme activities and increased ratios of nitrogen and sugar utilization and being capable of affording fermented food products having superior taste, flavor and quality.

The above and other objects of this invention along with its advantages will become more apparent from the following description.

According to the process of this invention, koji for fermented food products is prepared by modifying an unmodified koji substrate composed of a material preferably selected from the group consisting of vegetable protein materials, fish protein materials and vegetable carbohydrate materials, inoculating a koji mold in the resulting modified koji substrate, and cultivating it. The cultivation is carried out in the presence of 0.05 to 8% by weight, preferably 0.1 to 3% by weight, based on the total weight of the unmodified koji substrate, of a sodium or potassium salt of an aliphatic carboxylic acid containing up to 4 carbon atoms. The presence of the salt in amounts within this range is effective for the formation and accumulation of enzymes, and the effects are reduced when its amount falls outside the specified range.

The salt may be added to the unmodified koji substrate, or to the cultivation system before the termination of cultivation. It may be added at any desired point during this period. For example, the salt is added as the time of water dipping treatment of the unmodified koji substrate, or at the time of water sprinkling before or after the modifying treatment of the unmodified koji substrate, or at the time of inoculating a koji mold.

The specified amount of the salt may be maintained during the entire period of cultivation, or the amount can be adjusted to the specified range by feeding an additional supply of fresh salt. This is however not essential, and the objects of the invention can be fully achieved by causing the sodium or potassium salt of the aliphatic carboxylic acid to be present in the above-specified amounts for a certain period of time during the cultivation step.

At a relatively early stage of cultivation of a koji mold or a koji mold in the form of a seed starter in a modified koji substrate, the water content of the koji substrate is relatively high, and the growth of the hyphae of the koji mold is not yet sufficient. The cultivation system at this stage therefore offers especially suitable conditions for the growth of contaminating bacteria. Particularly favorable results can thus be obtained in this invention by adding the sodium or potassium salt of the aliphatic carboxylic acid before or during at least the first half of the cultivation step, and cultivating the mold in the presence of 0.05 to 8% by weight of the sodium or potassium salt of aliphatic carboxylic acid during the above-mentioned period. The salt added to the koji substrate is assimilated by the koji mold as the mold grows, and the concentration of the salt in the cultivation system gradually decreases. If desired, therefore, an additional supply of the salt is fed so as to maintain the salt concentration in the koji substrate at the above-specified range during the desired period.

The cultivation conditions can be varied according, for example, to the composition of the koji substrate, or the type of the strain of the koji mold used. Preferably, the cultivation is performed at a temperature of 20° to 40° C. The pH of the cultivation system can be varied suitably, but generally, it is 4 to 7.5. The cultivation time is generally 30 to 100 hours. Usually, the period from the beginning to the middle of the cultivation step, which is preferred for the presence of the salt in the specified amount, is a period which runs 15 to 50 hours from the beginning of cultivation. The specified concentration of the sodium or potassium salt of the aliphatic carboxylic acid may be maintained during the entire period or only during a certain length of time in this period.

In performing the process of this invention, the unmodified koji substrate composed of a material preferably selected from the group consisting of vegetable protein materials, fish protein materials and vegetable carbohydrate materials is modified by conventional modifying means. For example, a method of steaming treatment can be used in which water is added to the unmodified koji substrate or its raw materials, and it is heated with saturated steam at atmospheric or elevated pressures, followed by cooling the product spontaneously or rapidly, a method of roasting treatment wherein the materials are dry-heated at high temperatures either directly or after adding water, and a method of puffing treatment wherein with or without adding water, the materials are heat-treated with saturated steam or superheated steam at high temperatures, and the product is then rapidly released into the atmosphere at a lower pressure. The steaming, puffing and roasting treatments cited above are especially suitable for use in the present invention.

The proteinous material used as the unmodified koji substrate included, for example, vegetable protein materials of the soybean and wheat origin, such as soybean, defatted soybean, dehulled soybean or gluten. Fish meal is an example of the fish protein material. The carbohydrate material as the unmodified koji substrate may, for example, include wheat, wheat bran, rice, barley, oats, and corn. Soy sauce lees, sake lees, and rice bran can also be utilized. Needless to say, these materials can be used as mixtures of two or more.

According to the process of this invention, a koji mold is inoculated in the resulting modified koji substrate such as steamed koji substrate, pufed koji substrate or roasted koji substrate. It is possible to add the sodium or potassium salt of the aliphatic carboxylic acid to the unmodified substrate before the above-mentioned modifying treatment, or during the modifying treatment, or after the modifying treatment but before the inoculation of the koji mold, or at any time after the inoculation, preferably during at least the first half of the cultivation step. For operational advantages, the salt is added in the form of an aqueous solution diluted to a suitable concentration or in the form of a powder diluted by wheat flour or rice flour, etc.

The koji molds used in the process of this invention are known, and include, for example, known molds belonging to the genus *Aspergillus*, such as *Aspergillus sojae, Aspergillus oryzae,* or *Aspergillus tamarii*. For the production of soy sauce, known strains such as *Aspergillus sojae* IFO 4241, *Aspergillus sojae* IFO 4243, *Aspergil-*

*lus sojae* FERM-P504 (ATCC 20387), *Aspergillus oryzae* IFO 4240, *Aspergillus oryzae* IFO 5238, *Aspergillus oryzae* ATCC 14895, and *Aspergillus oryzae* ATCC 11494 are preferred. In the above designation of microorganism depositories, IFO stands for Institute for Fermentation, Osaka, Japan; FERM, Fermentation Research Institute, Agency of Industrial Science and Technology, Chiba, Japan; and ATCC, The American Type Culture Collection, U.S.A.

The sodium or potassium salts of aliphatic carboxylic acids having up to 4 carbon atoms used in the process of this invention are cheap and readily available, and include, for example, sodium or potassium salts of formic acid, acetic acid, propionic acid and butyric acid. Of these, sodium or potassium acetate and sodium or potassium propionate are preferred. A solution of the salt shows a buffering action when its pH is in the alkaline region.

Koji for fermented food products which is little contaminated by bacteria and has a higher enzyme unit can be obtained by a simple operation in accordance with the present invention. The koji shows an increased ratio of nitrogen utilization in the production of fermented food products, and can afford fermented food products of better taste, flavor and quality.

The sodium or potassium salt of the aliphatic carboxylic acid used in the present invention is almost or completely assimilated by koji molds, and a small number or yeast and bacteria during koji making. Even if it remains in the resulting koji, it is completely assimilated during the fermentation step in the production of fermented food products. Hence, the salt does not at all affect the taste of the final products nor does it cause any health hazard.

The koji obtained by the process of this invention contains bacteria in number as small as 1/100 to 1/20000 as compared with the koji obtained by the conventional processes, and the amounts of protease and amylase formed and accumulated, which are important for fermentation, are as much as 1.2 to 2.2 times, and 1.2 to 1.6 times, respectively the amounts of these in the koji obtained by the conventional processes. In the production of soy sauce, the koji in accordance with the invention shows a 3 to 6% increase in nitrogen utilization and causes an increase in the amount of glutamic acid. Hence, the soy sauce produced tastes very good. Likewise, the use of the koji in miso production gives miso of very good taste since the amounts of sugars and water-soluble nitrogen increase to 1.2-1.4 times, and 1.5-1.8 times, respectively. In the production of mirin, the ratio of utilization of sugars in the koji increases by 3 to 7%, and the amounts of amino acids and sugars increase to as high as 1.3-1.8 times, and 1.2-1.3 times, respectively, whereby the resulting mirin is of much body.

The following Examples illustrate the present invention in greater detail. The tests conducted in these Examples were by the same methods as used in the experiment described hereinabove.

EXAMPLE 1

Twenty-four lots of 10 kg of defatted soybeans were prepared, and 13.5 liters of warm water having dissolved in it each of the additives shown in Table 2 was sprayed uniformly onto the soybeans in each lot. The soybeans were then steamed for 10 minutes at a saturated vapor pressure of 2 kg/cm$^2$. The soybeans were then mixed with 10 kg of roasted and crushed wheat, and 200 g of a koji mold (the number of available spores $10^9$/g) of *Aspergillus oryzae* (ATCC 11494) was inoculated. Then, 3 ml of a suspension (the number of living cells $10^9$/ml) of various bacteria separated from soy sauce koji was uniformly sprayed over the cultivation system. Each of the lots was placed on a wooden tray, and in an incubator held at 30° C., subjected for 45 hours to a usual control of making soy sauce koji. Thus, 24 types of soy sauce koji were obtained. As a control, soy sauce koji was produced in quite the same manner as described above except that 13.5 liters of warm water containing no additive was sprayed uniformly on 10 kg of defatted soybeans.

The number of contaminating bacteria in the resulting koji and the activities of various enzymes in it were determined. Also, each of the koji products was charged into 40 liters of a 22% aqueous solution of common salt, and subjected to a usual control of moromi production at 30° C. for 150 days, followed by squeezing. The ratio of nitrogen utilization and the components of the resulting moromi liquid were measured, and the moromi liquid was subjected to the sensual test. The results obtained are shown in Table 1.

The results show that the koji products obtained by using the additives in accordance with this invention contained far less contaminating bacteria than the koji of Control, and the amounts of protease and amylase formed and accumulated were much larger. When soy sauce was produced by using these koji products, the ratio of nitrogen utilization and the amounts of useful components such as glutamic acid, sugars, and alcohol increased. The soy sauce obtained had excellent taste and flavor.

The results obtained are shown in Table 1. The tests were performed by the following methods.

(i) The number of bacteria was determined in the following manner. One gram of the koji was suspended in bacteria-free water. One cubic centimeter of the suspension was put into 7 cc of a culture medium containing 1% of meat extract 1% of polypeptone, 0.5% of yeast extract, 1% of glucose and 1.5% of agar and having a pH of 7.0, and cultivated at 37° C. for 24 hours. The number of colonies that appeared was measured.

(ii) The specific protease and amylase activities are ratios of activities when the activity values of the koji in Control 1 containing no additive are taken as 1. The protease and amylase activity values were measured by the following method. Ten grams of the koji was mixed with 100 ml of distilled water, and the mixture was allowed to stand for 24 hours at 5° C. The mixture was then filtered, and the filtrate was used as an enzyme solution. The protease and amylase activities of this solution were determined by the method described in the Japanese-language publication "Science of Seasoning", Vol. 22, No. 3, Page 14 (1975).

(iii) The ratio of nitrogen utilized is the percentage of the amount of dissolved nitrogen in the resulting soy sauce based on the total amount of nitrogen contained in the soy sauce making materials which was measured by the Kjeldahl's method.

(iv) NaCl, T.N., Glu., R.S., and Alc. given in the column of the analysis value of the moromi stand for sodium chloride, total nitrogen, glutamic acid, reducing sugars, and alcohol. The analysis was carried out by the method described in the Japanese-language publication "Analysis Methods in Fermentation" (by Shoichi Yamada, published by Sankyo Tosho Kabushiki Kaisha).

(v) In the sensual test, the taste of each of the moromi liquids in lots Nos. 1 to 24 was compared with that of the moromi liquid in Control 1. The results were rated on a scale of 0 (no difference), 1 (some difference), 2 (large difference), and 3 (very large difference). Where the moromi had a better flavor than the moromi of Control 1, the sign (+) was attached. The sign (−) thus shows that the flavor was inferior to the flavor of the moromi in Control 1. These ratings were average of the results obtained by a panel of 20 well-trained specialists having differentiating ability. The sign (*) in the column of "Value" shows that the difference was significant at 5% level; the sign (**) shows that the difference was significant at 1% level; and the sign (−) shows that the difference was not significant.

cells $10^9$/ml) of various bacteria separated from a rice koji was uniformly sprayed on it. Each of the lots was placed on a wooden tray, and put into an incubator kept at 30° C. It was subjected to a usual control of rice koji making for 48 hours. Thus, eight types of rice koji were obtained. As a control, a koji was produced in quite the same manner as set forth above except that 7 kg of polished rice with a degree of polishing of 10% was dipped in 10 liters of water containing no additive for 24 hours.

The number of contaminating bacteria and the protease and amylase activities of the resulting koji products were determined. Furthermore, 10 kg of the koji, 40 kg of steamed soybean, and 9 kg of common salt were mixed and aged at 25° C. for 90 days, and analyzed for components. The results are shown in Table 2.

Table 1

| Item Lot | Additive | Concent-ration (%) | Number of bacteria in Koji (per gram) | Enzyme activity of Koji Specific protease activity | Specific amylase activity | NaCl (%) | T.N. (%) | Glu. (mg/ml) | R.S. (%) | Alc. (%) | Ratio of nitrogen utilization (%) | Sensual test Rating | Value |
|---|---|---|---|---|---|---|---|---|---|---|---|---|---|
| Control | — | — | $5.3 \times 10^8$ | 1.0 | 1.0 | 17.25 | 1.75 | 13.2 | 4.05 | 2.40 | 83.1 | 0 | * |
| 1 | Sodium formate | 0.1 | $5.1 \times 10^6$ | 1.43 | 1.2 | 17.25 | 1.78 | 14.8 | 4.55 | 2.50 | 84.5 | +0.3 | * |
| 2 | " | 1.0 | $3.0 \times 10^6$ | 1.70 | 1.3 | 17.20 | 1.81 | 15.3 | 4.90 | 2.45 | 86.2 | +0.5 | * |
| 3 | " | 3.0 | $1.0 \times 10^6$ | 1.85 | 1.4 | 17.15 | 1.83 | 16.3 | 5.05 | 2.45 | 87.4 | +0.8 | * |
| 4 | Potassium formate | 0.1 | $2.8 \times 10^6$ | 1.46 | 1.3 | 17.25 | 1.78 | 14.9 | 4.65 | 2.50 | 84.5 | +0.3 | * |
| 5 | " | 1.0 | $1.5 \times 10^6$ | 1.79 | 1.4 | 17.20 | 1.82 | 15.5 | 5.00 | 2.50 | 86.7 | +0.4 | * |
| 6 | " | 3.0 | $8.0 \times 10^5$ | 1.83 | 1.4 | 17.20 | 1.83 | 15.9 | 5.35 | 2.40 | 87.2 | +0.7 | * |
| 7 | Sodium acetate | 0.1 | $2.5 \times 10^6$ | 1.54 | 1.3 | 17.20 | 1.80 | 15.8 | 5.55 | 2.50 | 85.7 | +0.5 | * |
| 8 | " | 1.0 | $1.0 \times 10^6$ | 2.15 | 1.6 | 17.15 | 1.82 | 16.2 | 5.70 | 2.55 | 86.9 | +2.0 | ** |
| 9 | " | 3.0 | $5.8 \times 10^5$ | 2.05 | 1.5 | 17.10 | 1.85 | 16.8 | 5.30 | 2.60 | 88.6 | +1.8 | ** |
| 10 | Potassium acetate | 0.1 | $1.9 \times 10^6$ | 1.85 | 1.3 | 17.20 | 1.81 | 16.0 | 5.60 | 2.60 | 86.1 | +0.6 | * |
| 11 | " | 1.0 | $1.0 \times 10^6$ | 1.93 | 1.6 | 17.15 | 1.85 | 16.8 | 5.60 | 2.55 | 88.4 | +2.1 | ** |
| 12 | " | 3.0 | $5.1 \times 10^5$ | 1.57 | 1.4 | 17.15 | 1.80 | 16.5 | 5.50 | 2.60 | 86.0 | +2.0 | ** |
| 13 | Sodium propionate | 0.1 | $1.8 \times 10^6$ | 1.91 | 1.4 | 17.20 | 1.80 | 15.9 | 5.55 | 2.60 | 85.7 | +0.5 | * |
| 14 | " | 1.0 | $9.2 \times 10^5$ | 2.09 | 1.6 | 17.15 | 1.85 | 16.5 | 5.60 | 2.50 | 88.4 | +1.9 | ** |
| 15 | " | 3.0 | $3.8 \times 10^5$ | 1.53 | 1.5 | 17.15 | 1.83 | 16.3 | 5.30 | 2.55 | 87.4 | +1.7 | ** |
| 16 | Potassium propionate | 0.1 | $1.0 \times 10^6$ | 2.01 | 1.5 | 17.15 | 1.82 | 16.5 | 5.50 | 2.70 | 86.9 | +1.5 | ** |
| 17 | " | 1.0 | $7.5 \times 10^5$ | 2.15 | 1.5 | 17.15 | 1.86 | 16.8 | 5.65 | 2.70 | 88.8 | +2.0 | ** |
| 18 | " | 3.0 | $3.0 \times 10^5$ | 1.48 | 1.4 | 17.20 | 1.80 | 16.1 | 5.35 | 2.50 | 85.7 | +0.6 | * |
| 19 | Sodium butyrate | 0.1 | $8.9 \times 10^5$ | 1.70 | 1.3 | 17.20 | 1.82 | 15.8 | 5.20 | 2.50 | 86.7 | +0.5 | * |
| 20 | " | 1.0 | $2.0 \times 10^5$ | 1.75 | 1.3 | 17.20 | 1.85 | 16.2 | 5.15 | 2.45 | 88.1 | +0.4 | * |
| 21 | " | 3.0 | $3.3 \times 10^4$ | 1.39 | 1.3 | 17.20 | 1.81 | 15.6 | 5.10 | 2.25 | 86.2 | +0.2 | — |
| 22 | Potassium butyrate | 0.1 | $7.5 \times 10^5$ | 1.65 | 1.4 | 17.15 | 1.83 | 16.1 | 5.05 | 2.45 | 87.4 | +0.4 | * |
| 23 | " | 1.0 | $2.1 \times 10^5$ | 1.70 | 1.3 | 17.20 | 1.84 | 16.0 | 5.00 | 2.30 | 87.6 | +0.4 | * |
| 24 | " | 3.0 | $3.1 \times 10^4$ | 1.37 | 1.3 | 17.20 | 1.81 | 15.8 | 4.85 | 2.20 | 86.2 | +0.1 | — |

EXAMPLE 2

Eight lots of 7 kg of polished rice with a degree of polishing of 10% were prepared, and washed in a customary manner. Each of the lots was dipped for 24 hours in 10 liters of water to which 70 g (1% by weight based on the entire koji-making materials) of each of the additives shown in Table 3 was added. It was steamed in a customary manner, and allowed to cool. Then 10 g of a koji mold (the number of available spores $10^9$/g) of *Aspergillus oryzae* (ATCC 14895) was uniformly sprayed, and 1 ml of a suspension (the number of living The results demonstrate that the koji products obtained by the process of this invention contained bacteria in number 1/300 to 1/3000 time as compared with the control koji, and the amounts of protease and amylase formed and accumulated were 1.4 to 2.2 times and 1.3 to 1.6 times the amounts of these obtained with the Control. When miso was produced by using these koji products, the amounts of sugars and water-soluble nitrogen increased to 1.2 to 1.4 times and 1.5 to 1.8 times, respectively, over the Control. The miso obtained had excellent taste and flavor.

Table 2

| Item Lot | Additives | Number of bacteria in Koji (per gram) | Enzyme activity of Koji Specific protease activity | specific amylase activity | NaCl (%) | R.S. (%) | T.N. (%) | Water soluble T.N. (%) | Water-soluble T.N. Total T.N. × 100 |
|---|---|---|---|---|---|---|---|---|---|
| Control | — | $5.3 \times 10^7$ | 1.0 | 1.0 | 10.30 | 12.2 | 2.10 | 0.81 | 38.6 |
| 1 | Sodium formate | $1.8 \times 10^5$ | 1.65 | 1.3 | 10.72 | 15.3 | 2.18 | 1.20 | 55.0 |
| 2 | Potassium formate | $1.1 \times 10^5$ | 1.70 | 1.3 | 10.69 | 15.5 | 2.15 | 1.25 | 58.1 |
| 3 | Sodium acetate | $1.0 \times 10^5$ | 2.15 | 1.6 | 10.11 | 16.8 | 2.13 | 1.41 | 66.2 |
| 4 | Potassium acetate | $7.5 \times 10^4$ | 2.05 | 1.5 | 10.11 | 17.0 | 2.11 | 1.45 | 68.7 |
| 5 | Sodium propionate | $5.0 \times 10^4$ | 2.10 | 1.6 | 10.17 | 17.3 | 2.11 | 1.47 | 69.7 |
| 6 | Potassium propionate | $3.0 \times 10^4$ | 2.15 | 1.6 | 10.12 | 17.1 | 2.12 | 1.48 | 69.8 |
| 7 | Sodium butyrate | $3.2 \times 10^4$ | 1.50 | 1.4 | 10.15 | 16.5 | 2.12 | 1.31 | 61.8 |

Table 2-continued

| Item | | Enzyme activity of Koji | | Analysis of components | | | | |
|---|---|---|---|---|---|---|---|---|
| | | Number of bacteria in Koji | Specific protease | Specific amylase | specific NaCl | R.S. | T.N. | Water soluble T.N. | Water-soluble T.N. Total T.N. |
| Lot | Additives | (per gram) | activity | activity | (%) | (%) | (%) | (%) | × 100 |
| 8 | Potassium butyrate | 1.8 × 10$^4$ | 1.45 | 1.3 | 10.25 | 16.3 | 2.13 | 1.29 | 70.7 |

EXAMPLE 3

Eight lots of 64 kg polished rice with a degree of polishing of 10% were prepared, and were washed, dipped, water-freed, and steamed in a customary manner. Then, 3 liters of warm water containing 320 g (0.5% by weight based on the entire koji-making materials) of each of the additives shown in Table 4 was uniformly sprayed over the treated rice in each lot. Simultaneously, 100 g of a rice koji mold (the number of available spores 10$^9$/g) of *Aspergillus oryzae* IFO 5238 was inoculated uniformly. Then, 10 ml of a suspension (the number of living cells 10$^9$/ml) of various bacteria separated from rice koji was uniformly sprayed over the cultivation system. Each of the lots was placed in a wooden tray, and subjected to a usual control of rice koji making for 48 hours in an incubator kept at 30° C. Thus, eight types of rice koji were obtained. As a Control, koji was produced in quite the same manner as set forth above except that 64 kg of polished rice with a degree of polishing of 10% was washed, dipped, water-freed, and steamed, and then 3 liters of warm water containing no additive was uniformly sprayed over it.

The number of contaminating bacteria, and the protease and amylase activities of the resulting koji products were determined. Furthermore, 90 kg of the resulting koji, 500 kg of steamed sticky rice, and 234 liters of a 45% aqueous solution of ethyl alcohol were mixed, and subjected to a usual control of mirin production at 25° C. for 60 days. The resulting liquid was squeezed, and the utilization of sugars was measured, and the components of the resulting liquid were analyzed. The results are shown in Table 3.

The results demonstrate that the koji products obtained by the process of the invention contained contaminating bacteria in number 1/300 to 1/2000 time as compared with the koji in Control, and the amounts of protease and amylase formed and accumulated were much larger. When mirin was produced using these koji products, the ratio of utilization of sugars increased by 3 to 7%, and the amounts of amino acids such as glycine and sugars increased markedly. Mirin full of body was obtained.

Table 3

| Item Lot | Additive | Number of bacteria in Koji (per gram) | Enzyme activity of Koji | | Component analysis of moromi liquid | | | | | Ratio of utilization of sugars (%) | Sensual test | |
|---|---|---|---|---|---|---|---|---|---|---|---|---|
| | | | Specific protease activity | Specific amylase activity | Baume | Alcohol (%) | Amino acid (as glycine) (%) | Sugars (%) | pH | | Rating | Value |
| Control | — | 4.8 × 10$^7$ | 1.0 | 1.0 | 19.5 | 15.0 | 0.22 | 42.0 | 5.4 | 80.5 | 0 | — |
| 1 | Sodium formate | 1.5 × 10$^5$ | 1.55 | 1.3 | 19.6 | 14.8 | 0.29 | 50.0 | 5.4 | 83.2 | +0.5 | * |
| 2 | Potassium formate | 1.0 × 10$^5$ | 1.67 | 1.3 | 19.7 | 14.8 | 0.29 | 51.5 | 5.4 | 84.0 | +0.5 | * |
| 3 | Sodium acetate | 1.1 × 10$^5$ | 1.92 | 1.5 | 20.2 | 14.5 | 0.33 | 55.3 | 5.5 | 85.3 | +1.9 | ** |
| 4 | Potassium acetate | 7.0 × 10$^4$ | 2.02 | 1.6 | 20.5 | 14.6 | 0.35 | 56.8 | 5.5 | 86.6 | +1.8 | ** |
| 5 | Sodium propionate | 4.4 × 10$^4$ | 2.10 | 1.6 | 20.5 | 14.6 | 0.40 | 57.0 | 5.5 | 87.0 | +2.1 | ** |
| 6 | Potassium propionate | 4.1 × 10$^4$ | 2.00 | 1.5 | 20.7 | 14.5 | 0.40 | 56.5 | 5.5 | 86.1 | +2.2 | ** |
| 7 | Sodium butyrate | 2.7 × 10$^4$ | 1.40 | 1.3 | 19.5 | 14.8 | 0.28 | 51.5 | 5.5 | 84.1 | +0.4 | * |
| 8 | Potassium butyrate | 2.2 × 10$^4$ | 1.35 | 1.3 | 19.5 | 14.8 | 0.28 | 50.5 | 5.5 | 83.5 | +0.4 | * |

What we claim is:

1. In a process for producing koji for fermented food products which comprises inoculating a koji mold in a modified koji substrate and cultivating it at a temperature of 20° to 40° C. for a time sufficient to produce koji for fermented food products, the improvement wherein the cultivation is carried out in the presence of 0.05 to 8% by weight, based on the total weight of the unmodified koji substrate, of a sodium or potassium salt of an aliphatic carboxylic acid containing up to 4 carbon atoms.

2. The process of claim 1 wherein the cultivation is continued for 30 to 100 hours.

3. The process of claim 1 wherein the amount of the sodium or potassium salt of the aliphatic carboxylic acid is 0.1 to 3% by weight based on the total weight of the unmodified koji substrate.

4. The process of claim 1 wherein the sodium or potassium salt of the aliphatic acid is sodium or potassium acetate.

5. The process of claim 1 wherein the sodium or potassium salt of the aliphatic carboxylic acid is sodium or potassium propionate.

6. The process of claim 1 wherein the koji substrate is selected from the group consisting of soybeans, defatted soybeans, dehulled soybeans, gluten, rice, wheat, wheat bran, barley, oats, corn, fish meal, soy sauce lees, sake lees and rice bran.

7. The process of claim 1 wherein the sodium or potassium salt of the aliphatic carboxylic acid is present during at least the first half of the cultivation step.

8. The process of claim 1 wherein the fermented food product is soy sauce, miso, mirin or sake.

* * * * *